United States Patent
Hatta et al.

(10) Patent No.: US 10,911,260 B2
(45) Date of Patent: Feb. 2, 2021

(54) LINK CONTROL CIRCUIT

(71) Applicant: NIPPON TELEGRAPH AND TELEPHONE CORPORATION, Tokyo (JP)

(72) Inventors: Saki Hatta, Tokyo (JP); Nobuyuki Tanaka, Tokyo (JP); Satoshi Shigematsu, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 102 days.

(21) Appl. No.: 16/319,012

(22) PCT Filed: Jul. 18, 2017

(86) PCT No.: PCT/JP2017/025905
§ 371 (c)(1),
(2) Date: Jan. 18, 2019

(87) PCT Pub. No.: WO2018/016469
PCT Pub. Date: Jan. 25, 2018

(65) Prior Publication Data
US 2019/0245715 A1    Aug. 8, 2019

(30) Foreign Application Priority Data

Jul. 22, 2016 (JP) .................................. 2016-144013

(51) Int. Cl.
*H04L 12/44* (2006.01)
*H04J 14/02* (2006.01)

(52) U.S. Cl.
CPC .......... *H04L 12/44* (2013.01); *H04J 14/0247* (2013.01)

(58) Field of Classification Search
CPC ......... H04Q 11/0067; H04Q 2011/0064; H04J 14/0249–0252; H04L 12/44
See application file for complete search history.

(56) References Cited

U.S. PATENT DOCUMENTS

2009/0080379 A1    3/2009  Takashima
2010/0239252 A1*   9/2010  Davis ................. H04Q 11/0067
                                                       398/58
(Continued)

FOREIGN PATENT DOCUMENTS

JP    2009-077317 A    4/2009
JP    2009-260668 A    11/2009
(Continued)

OTHER PUBLICATIONS

International Search Report and Written Opinion received for PCT Patent Application No. PCT/JP2017/025905, dated Oct. 24, 2017, 11 pages (6 pages of English Translation and 5 pages of Original Document).

(Continued)

*Primary Examiner* — Marcus Smith
(74) *Attorney, Agent, or Firm* — Womble Bond Dickinson (US) LLP

(57) ABSTRACT

A link control circuit (10) includes a plurality of hardware processing units serving as an uplink parser unit (11) configured to output, as an event, the contents of link control notified by an uplink control frame, a timer unit (12) configured to start/stop a timer and output a link event in accordance with expiration of the timer, a frame generation unit (13) configured to generate a downlink control frame containing the contents of link control, and a state management unit (15) configured to manage the state of the link in accordance with these events, and instruct the timer unit to start/stop the timer and the frame generation unit to generate the downlink control frame in accordance with the state of (Continued)

the link, thereby controlling connection establishment, maintenance, and disconnection of the link. Each of the hardware processing units includes a memory configured to store an externally changeable internal program describing a corresponding processing operation, and a processor configured to execute the corresponding processing operation in accordance with the internal program.

20 Claims, 10 Drawing Sheets

(56) References Cited

U.S. PATENT DOCUMENTS

| | | | |
|---|---|---|---|
| 2013/0039182 A1* | 2/2013 | Das | H04L 47/14 370/235 |
| 2016/0080208 A1* | 3/2016 | Takemoto | H04L 47/805 398/66 |
| 2017/0338891 A1* | 11/2017 | Sasaki | H04B 10/27 |

FOREIGN PATENT DOCUMENTS

| | | |
|---|---|---|
| JP | 2012-080402 A | 4/2012 |
| JP | 2014-165714 A | 9/2014 |
| JP | 2016-131453 A | 7/2016 |
| JP | 5992847 B2 | 9/2016 |
| JP | 2016-210246 A | 12/2016 |
| JP | 2017-000973 A | 1/2017 |
| JP | 2017-028381 A | 2/2017 |

OTHER PUBLICATIONS

International Preliminary Report on Patentability received for PCT Patent Application No. PCT/JP2017/025905, dated Jan. 31, 2019, 10 pages (6 pages of English Translation and 4 pages of Original Document).

Office Action received for Japanese Patent Application No. 2018-528544, dated Jun. 11, 2019, 4 pages (2 pages of English Translation and 2 pages of Office Action).

* cited by examiner

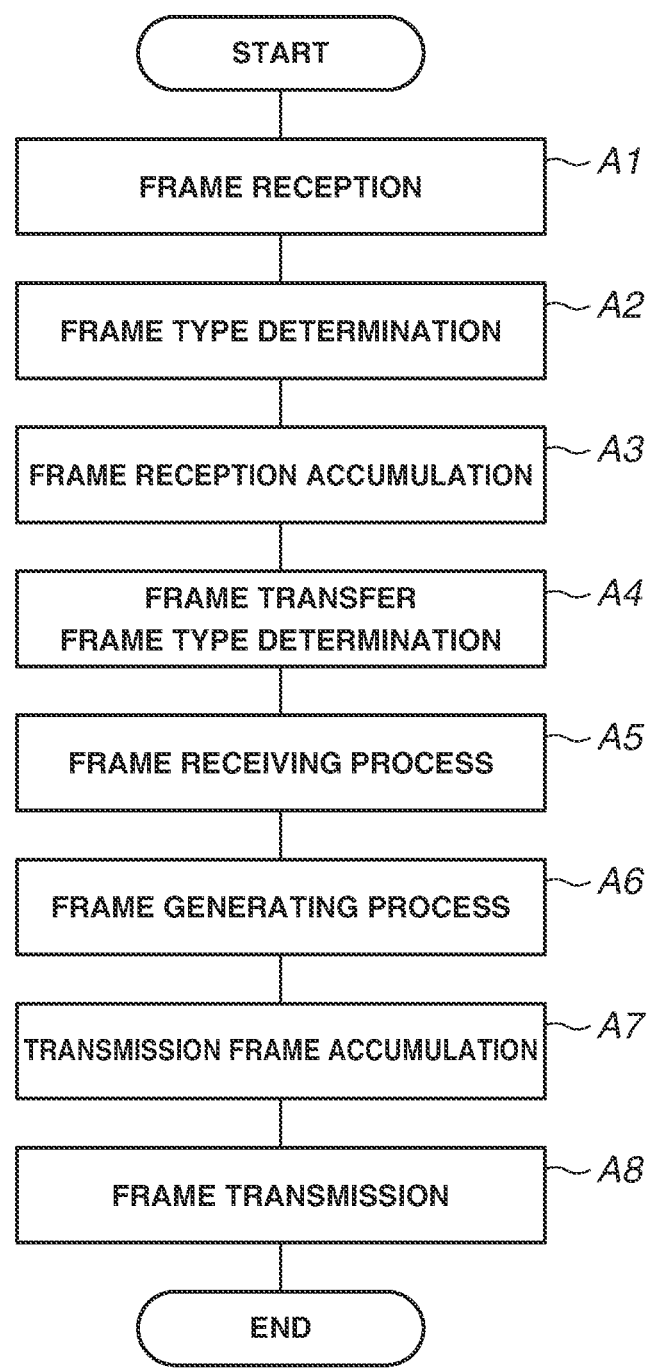

LINK CONTROL CIRCUIT

TECHNICAL FIELD

The present invention relates to a link control circuit for controlling a link which a parent station uses to perform data communication with a plurality of child stations.

BACKGROUND ART

A PON (Passive Optical Network) system is one communication system comprising a parent station and a plurality of child stations. This system performs communication by using an OLT (Optical Line Terminal) installed in an office building as a parent station, and an ONU (Optical Network Unit) installed in each user house as a child station.

As shown in FIG. 5, the PON system includes an OLT connected to a host network, a plurality of (m) ONUs, and optical fibers and an optical splitter SP for connecting the OLT and m ONUs by 1:m. In this PON system, signals transmitted from the plurality of ONUs are transmitted to the OLT by being bundled by the optical splitter SP. To prevent collision of these signals, therefore, IEEE802.3 and IEEE802.3av define an MPCP (Multi-Point Control Protocol) for controlling OLT-ONU communication.

According to the MPCP definition, in downlink communication from the OLT to the ONUS, the OLT transmits a downlink frame, to which an ID (identification number) assigned to each ONU is added, by time-division multiplexing, and this downlink frame is branched by the optical splitter and transferred to all ONUS. Each ONU extracts and receives only a downlink frame addressed to the ONU in accordance with the ID of the downlink frame.

On the other hand, in uplink communication from the ONUS to the OLT, each ONU transmits an uplink frame, to which the ID assigned from the OLT is added, by using a bandwidth (a transmission start time and a transmission duration) allocated from the OLT, and the uplink frames from the ONUS are merged by the optical splitter and transferred to the OLT. The OLT discriminates the ONU as a transmission source of the uplink frame in accordance with the ID of the uplink frame and receives the frame.

The OLT periodically executes a discovery process based on the MPCP, assigns an ID to an ONU to be connected anew, and establishes connection. An outline of the discovery process will be explained below. Following processes (1) to (7) correspond to the individual control frames of the discovery process shown in FIG. 6.

(1) The OLT transmits a discovery gate frame to all ONUS. This discovery gate frame describes a local time t1 of the OLT, a time T1 at which a new ONU can start outputting an uplink frame, and a broadcast ID as an identifier.

(2) When an ONU not having established a link to the OLT receives the discovery gate frame, the ONU sets t1 described in the discovery gate frame as its own local time, thereby synchronizing the time with the OLT. Then, after an elapse of a random time from the time T1 designated in the discovery gate frame, the ONU transmits a register request frame to the OLT, thereby requesting registration. Since no ID is assigned to the ONU at that timing, a broadcast ID is described as an identifier in the register request frame.

(3) The OLT assigns a unique ID to the ONU having transmitted the register request frame, and notifies the ONU of the assigned ID by transmitting a register frame.

(4) Subsequently, the OLT transmits a gate frame describing a transmission start time T2 of the next frame to the ONU, and waits for the arrival of a register ACK frame.

(5) Upon receiving the register frame and gate frame, the ONU transmits the register ACK frame at the transmission start time T2 designated by the gate frame. When the OLT receives the register ACK frame from the ONU, a link between the OLT and ONU is established. The foregoing is the discovery process.

(6) After the link is established, the OLT transmits a gate frame describing a transmission start time T3 of an uplink signal of the ONU.

(7) The ONU receives the gate frame, waits in a transmission standby state until the transmission start time T3 designated in the frame, and calculates a frame amount to be accumulated until that time. At the transmission start time T3, the ONU notifies the OLT of the transmission frame amount by a report frame.

After receiving the report frame, the OLT assembles the order of transmission start times for the individual ONUS in accordance with the transmission frame amount notified from each ONU and an algorithm of bandwidth allocation (DBA: Dynamic Bandwidth Allocation), and sequentially transmits gate frames to the ONUS. Upon receiving the gate frame, the ONU transmits an uplink frame at the time designated in the gate frame, and transmits a report frame for obtaining the next gate frame. The OLT and ONU maintain the link by repeating communication following the above procedures. Note that if the OLT cannot receive the above-described frame from an ONU for a predetermined period, the OLT determines timeout, and disconnects the link to the ONU.

A configuration example of a communication processing LSI to be used in the OLT will be explained below. As shown in FIG. 7, a general communication processing LSI includes a reception processing circuit, FEC circuit, encryption circuit, link control circuit, data processing circuit, and transmission processing circuit, and each circuit operates based on initial settings from a host CPU externally connected to the communication processing LSI.

First, the reception processing circuit divides an uplink frame transmitted from each ONU into a control frame and data frame. The control frame is a communication frame for implementing the OLT-ONU discovery process explained so far, and also indicates general frames to be used to perform control from the OLT to the ONU. The data frame is a frame other than the control frame.

The FEC circuit and encryption circuit perform an error correction process and decryption process on the two frames, and input the processed frames to the link control circuit. The link control circuit identifies the control frame and data frame, and inputs the data frame to the data processing circuit. On the other hand, the link control circuit terminates the control frame. The link control circuit outputs a downlink control frame to the FEC circuit and encryption circuit in accordance with an uplink control frame. The data processing circuit having received the data frame performs a buffering process and bridge processing to the host network, and outputs the data frame to an SNI (Service Network Interface) Side.

The data processing circuit specifies an destination ONU from a destination MAC address or the like for an input downlink frame from SNI side, adds an ID corresponding to the ONU to the frame, and outputs the frame to the FEC circuit and encryption circuit through the link control circuit. The link control circuit identifies a control frame contained in the downlink data frame, and, if the control frame exists, performs processing corresponding to the frame. The transmission processing circuit time-divisionally multiplexes the data frame and control frame, and outputs the multiplexed frames to a UNI (User Network Interface). Note that the time-division multiplexing of the data frame and control frame need not be performed by the transmission processing circuit alone, and may also be performed by the link control circuit on the preceding stage.

Detailed functions required of the link control circuit will be explained below. The link control circuit receives a plurality of types of control frames, and performs processing corresponding to each type. As an example, processing to be performed when a register ACK frame is received will be explained. In the frame format (IEEE802.3av) of the register ACK frame shown in FIG. 8, it is defined that the control frame has a length of 64 bytes for all types regardless of the register ACK frame, and 0 is padded after the field described in FIG. 8 so that the length becomes 64 bytes. Also, control frame information contains information (e.g., SA) which changes from one ID to another, and information (e.g., Type and Opcode) which is common to all IDs but changes from one type to another.

When the register ACK frame is input to the link control circuit, the link control circuit first determines whether the type field and opcode field are respectively Type=0×8808 and Opcode=0×0006. If the determination result indicates that all pieces of information match, the link control circuit regards the received frame as the register ACK frame, and starts a receiving process.

The register ACK frame receiving process mainly includes frame normal/abnormal reception determination and a starting/stopping process of various timers. In the frame normal/abnormal reception determination, whether the DA (Destination Address) in the register ACK frame field is correct (DA discarding determination), whether the values of "Echoed Assigned Port, Echoed Sync Time" in the DATA field are the same as the values when the register frame is transmitted (echo parameter determination), whether drift occurs in RTT (Round Trip Time) calculated by using the value of the timestamp field and the local time value (drift check determination), and the like are determined.

If the determination results indicate normal reception, this means that the link is established, so the link control circuit performs the process of stopping the timer measuring the maximum reception interval of the register ACK, and starts a timer for performing alive management of the ONU. On the other hand, if the determination results indicate abnormal reception, the link control circuit performs the process of discarding the frame.

To perform the above processes, the link control circuit is required to have a function of determining a type (a type determining function), a function of performing frame processing by performing calculations by using the field value or a fixed value in accordance with the type (a frame processing function), a function of measuring a time (a timer function), and a function of managing a state machine for each ID and controlling each processing block (a state managing function). The processing example of the register ACK frame is an example of the receiving process of the control frame processing. In addition to the abovementioned processing, the transmitting process requires a function of generating a control frame (a frame generating function). A function of processing DBA (a bandwidth control function) is also necessary.

As shown in FIG. 9, the conventional link control circuit has buffer memories for storing the whole control frame for each ID (patent literature 1). In order to secure the future extensibility, one CPU sequentially executes the link control processes such as the control frame type determination, frame processing, frame generation, and state management based on software such as an MPCP processing program by referring to buffer memories such as a received frame memory and transmission frame memory.

Next, an operation example of the conventional frame processing will be explained with reference to FIG. 10.

As shown in FIG. 10, when a frame is received (step A1), type determination is performed to determine whether the received frame is a control frame (step A2). If the received frame is a control frame, the whole frame is stored in the buffer memory (step A3). When processing preparations in a controller are complete, the control frame is read out from the buffer memory, and the controller performs type determination again (step A4), and performs frame processing corresponding to the type (step A5). After that, a control frame to be transmitted to the ONU is generated (step A6), stored in the transmission frame buffer (step A7), and transmitted (step A8).

The related art as described above has hardware which, when a control frame to which no ID is assigned is received, performs an operation of assigning an unused ID by referring to an ID assignment management register, so an unassigned ID dedicated memory can be reduced. Basically, however, one CPU sequentially executes the processes based on software by referring to the buffer memories, and this poses the following problems.

First, the memory capacity for storing control frames can be reduced to only the number of IDs×the frame length. Also, the link control circuit duplicately stores unnecessary information of each ID in the memory, and this increases the circuit scale as the number of IDs increases. In addition, since the load of the software processing increases as the number of IDs increases, the processing speed of the whole circuit decreases, so processing cannot be completed within a desired time.

These problems can be solved by using a plurality of hardware-based processors as all the processors. However, if hardware-based processors are used as all the processors, the future extensibility cannot be assured any longer. The extensibility can be secured by using hardware such as an FPGA, but the circuit scale and power consumption explosively increase if the FPGA is used. This is so because the FPGA has the feature that the circuit configuration can be changed bit by bit, and hence has extensibility corresponding to all applications. From the foregoing, it has been impossible to implement a link control circuit which achieves a small area and real-time processing while ensuring the extensibility.

RELATED ART LITERATURE

Patent Literature

Patent Literature 1: Japanese Patent Laid-Open No. 2012-80402

DISCLOSURE OF INVENTION

Problem to be Solved by the Invention

The present invention has been made to solve the problem as described, and has as its object to provide a link control circuit capable of eliminating an increase in circuit scale and a decrease in processing speed caused by an increase in number of IDs, while maintaining the future extensibility.

Means of Solution to the Problem

To achieve the above object, a link control circuit according to the present invention is a link control circuit which is used in a parent station for performing data communication with a plurality of child stations, and controls a link to be used in data communication with the child stations, comprising, as the abovementioned hardware processing units, a plurality of hardware processing units configured to operate as an uplink parser unit configured to notify, by an event frame, a content of control of the link notified by an uplink control frame received from the child station, a timer unit configured to start/stop a timer for managing a state of the link, and notify expiration of the timer by an event frame, a frame generation unit configured to generate a downlink control frame containing the content of control of the link to be notified to the child station, and a state management unit configured to manage the state of the link in accordance with the event frames from the uplink parser unit and the timer unit, and, in accordance with the state of the link, instruct the timer unit to start/stop the timer by an event frame, and instruct the frame generation unit to generate the downlink control frame by an event frame, thereby controlling connection establishment, maintenance, and disconnection of the link, wherein each of the plurality of hardware processing units includes a memory configured to store an externally changeable internal program describing a corresponding processing operation, and a processor configured to execute the processing operation in accordance with the internal program.

Effect of the Invention

In the present invention, a host CPU rewrites parameters of the internal programs and internal registers of these hardware processing units. This makes it possible to implement various criteria and processing contents of frame type determination, and various kinds of timers.

Accordingly, the link control circuit can be configured by programmable hardware processing units specialized to the link control process. Consequently, it is possible to eliminate an increase in circuit scale and a decrease in processing speed caused by an increase in number of IDs, while maintaining the future extensibility.

BRIEF DESCRIPTION OF DRAWINGS

FIG. 10 is a flowchart showing conventional frame processing.

BEST MODE FOR CARRYING OUT THE INVENTION

Embodiments of the present invention will be explained below with reference to the accompanying drawings.

First Embodiment

First, a link control circuit 10 according to the first embodiment of the present invention will be explained with reference to FIG. 1.

The link control circuit 10 is used in a parent station which performs data communication with a plurality of child stations, and has a function of controlling a link to be used in data communication with these child stations by operating a plurality of hardware processing units.

Figure 1:
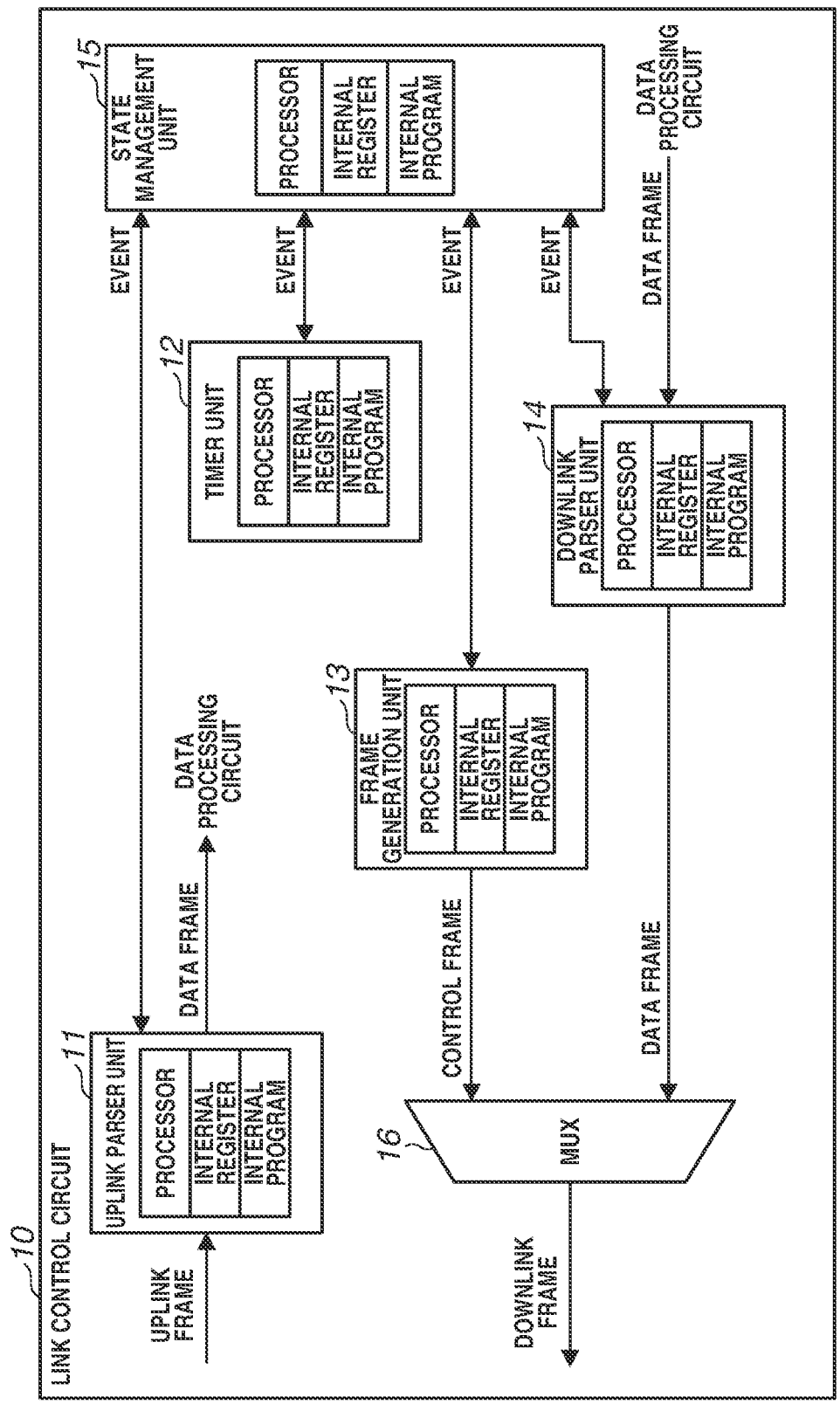
FIG. 1 is a block diagram showing the configuration of a link control circuit according to the first embodiment.

As shown in FIG. 1, the link control circuit 10 includes an uplink parser unit 11, a timer unit 12, a frame generation unit 13, a downlink parser unit 14, and a state management unit 15 as main hardware processing units.

Figure 7:
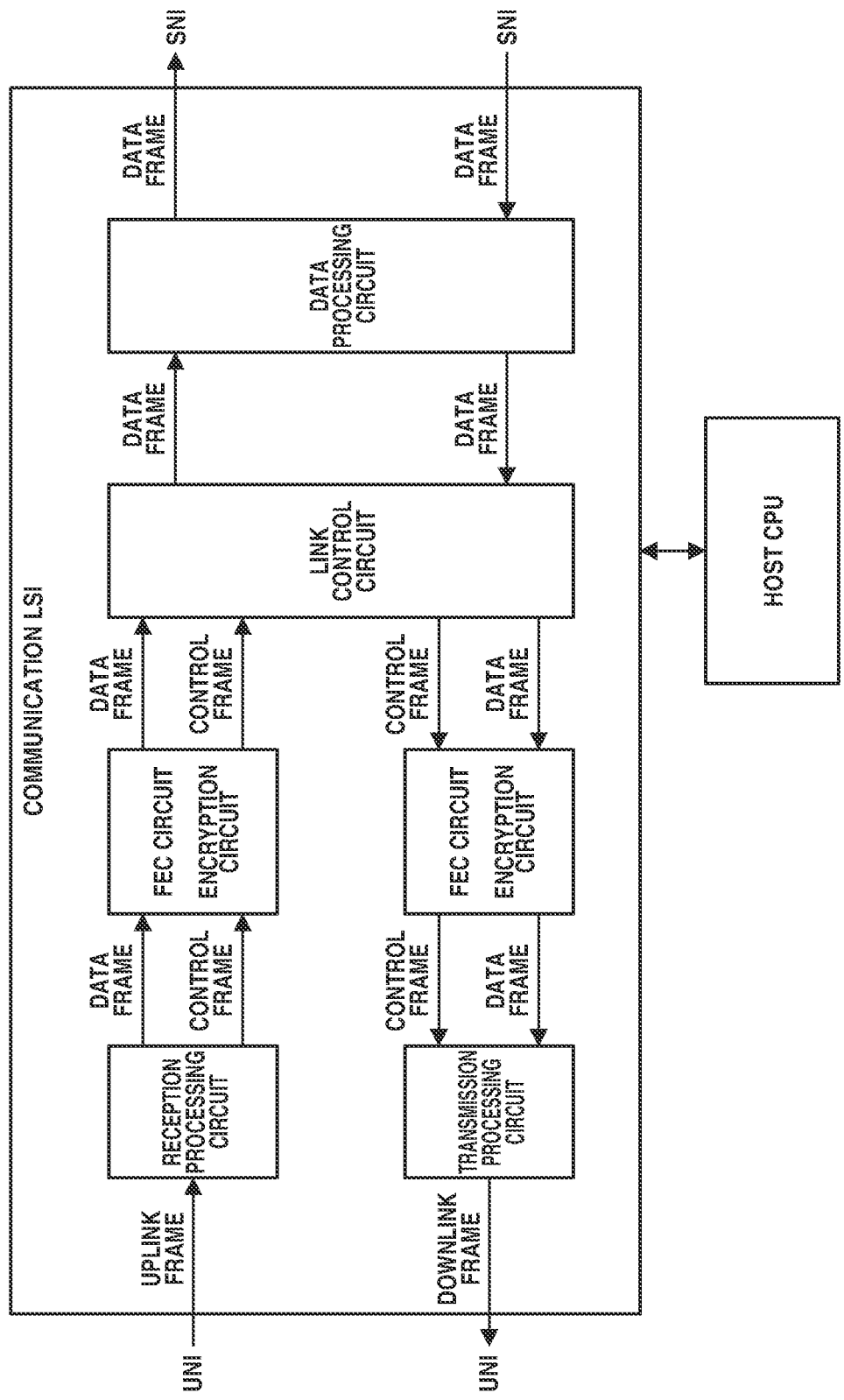
FIG. 7 shows a configuration example of a general communication processing LSI.
Figure 8:
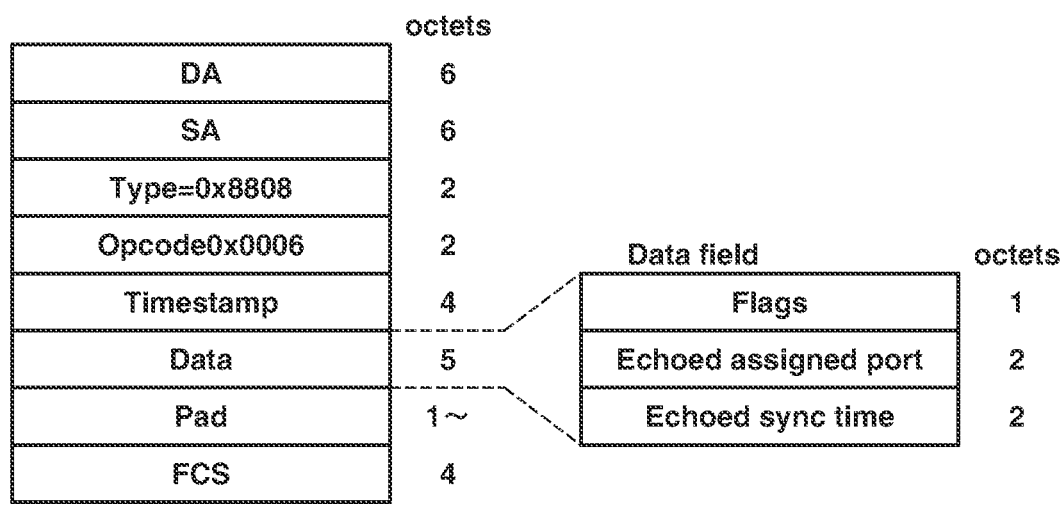
FIG. 8 shows the frame format (IEEE802.3av) of a register ACK frame.
Figure 9:
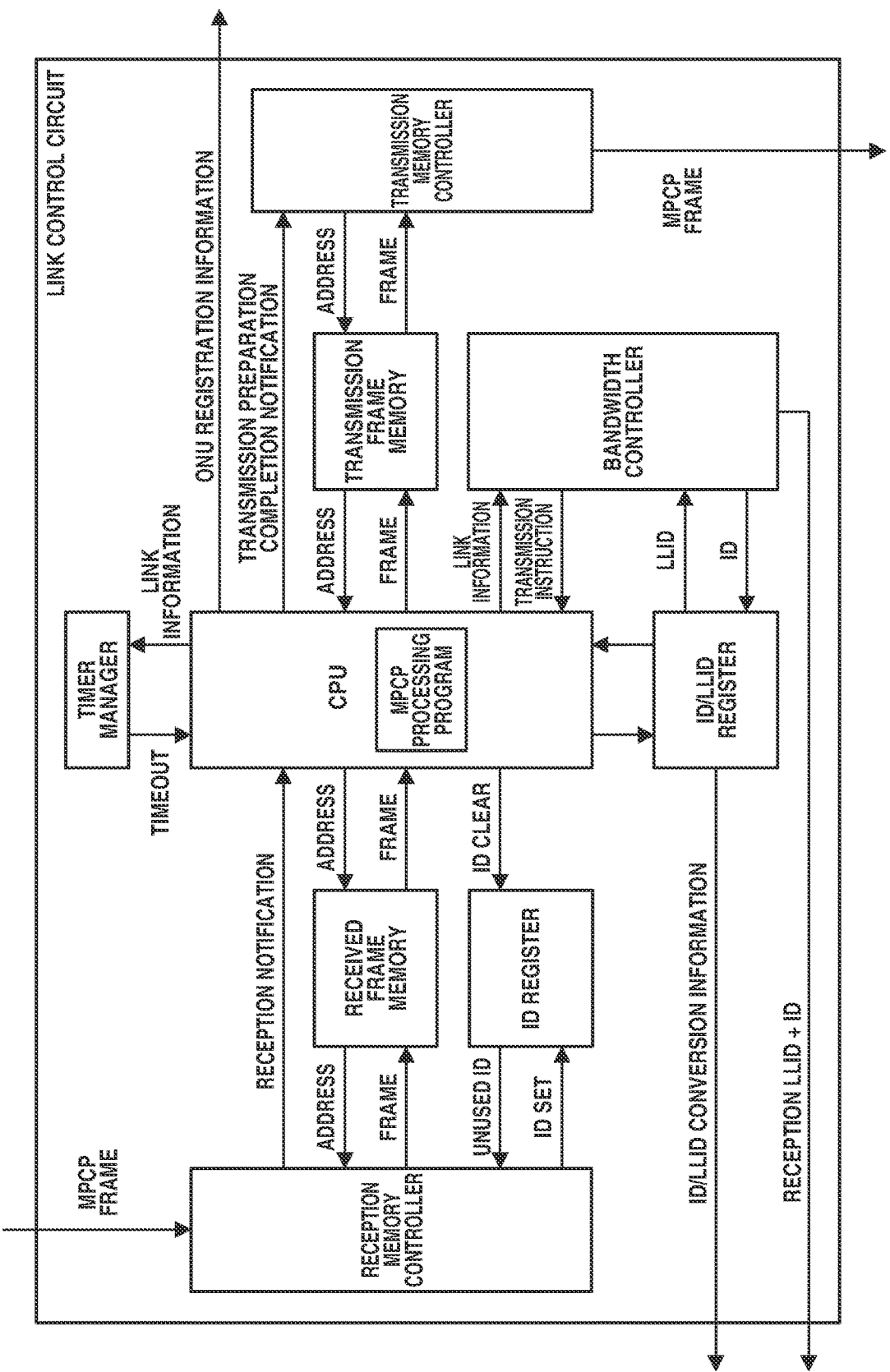
FIG. 9 is a block diagram of a conventional link control circuit.

The present invention will be explained by taking, as an example, a case in which the parent station is an OLT configuring a PON system, the child station is an ONU connected to the OLT, and the link control circuit 10 is packaged in a communication processing LSI together with a reception processing circuit, FEC circuit, encryption circuit, data processing circuit, and transmission processing circuit by a connection configuration as shown in FIG. 7.

The hardware processing units formed in the link control circuit 10 have the following functions as main functions by which the OLT controls the link to be used in data communication with the ONU.

The uplink parser unit 11 has a function of notifying, by an event frame, the contents of link control notified by an uplink control frame received from a child station.

The timer unit 12 has a function of starting/stopping a timer for managing the state of the link, and notifying the expiration of the timer by an event frame.

The frame generation unit 13 has a function of generating and outputting a downlink control frame containing the contents of link control to be notified to a child station.

The state management unit 15 has a function of managing the state of the link in accordance with event frames from the uplink parser unit 11 and timer unit 12, a function of instructing, by an event frame, the timer unit 12 to start/stop the timer in accordance with the state of the link, and instructing, by an event frame, the frame generation unit 13 to generate a downlink control frame in accordance with the state of the link, and a function of controlling connection establishment, maintenance, and disconnection of the link by causing the above functions to cooperate with each other.

Also, the downlink parser unit 14 has a function of selecting a downlink data frame to be transmitted to a child station from downlink frames received from a host network, and a function of outputting the selected downlink data frame and the output downlink control frame from the frame generation unit 13 to a multiplexer (MUX) 16 for multiplexing these frames.

Each of these hardware processing units includes an internal memory for storing an internal program describing the corresponding processing operation, an internal register for holding a parameter to be used in the processing operation, and a processor for executing the processing operation in accordance with the internal program and parameter.

These internal program and parameter are held in the internal memory and internal register so as to be changeable by the host CPU externally connected to the link control circuit 10 as shown in FIG. 7 described earlier.

Also, as a configuration example of the uplink parser unit 11, frame generation unit 13, and downlink parser unit 14 of the hardware processing units, it is also possible to apply a configuration of Japanese Patent No. 5992847 (Japanese Patent Laid-Open No. 2014-165714) or Japanese Patent Application No. 2016-210246. In this case, these hardware processing units include a selector, ALU (Arithmetic Logic Unit), and register as processors. The selector extracts data indicating the type of input frame, and the ALU specifies a frame type by performing a subtraction process on the data from the selector. By outputting control signals from the internal program to the selector and ALU, it is possible to extract an arbitrary portion and perform an arbitrary type of calculation. By using a similar configuration, it is possible to change the order of frame data in the selector, and hold the data in the register. This makes it possible to generate a frame.

In addition, as a configuration example of the timer unit 12 of the hardware processing units, a configuration of Japanese Patent Laid-Open No. 2017-028381 or Japanese Patent Application No. 2017-000973 is applicable. In this case, the timer unit 12 includes a down counter for performing countdown from an arbitrary initial value by an arbitrary granularity (accuracy) as a processor. Various kinds of timers can be implemented by designating the initial value and granularity of the down counter from the internal program.

Furthermore, a configuration of Japanese Patent Application No. 2016-131453 can be applied as a configuration example of the state management unit 15 of the hardware processing units. In this case, the state management unit 15 includes, as processors, a circuit for processing an instruction specialized to a state changing process, a decoder for the instruction, and a circuit for deciding an address corresponding to the instruction. The internal program contains a combination of these instruction sets. Various kinds of state management processes are implemented by changing the instruction set combination by the internal program.

Operation of First Embodiment

The operation of the link control circuit 10 according to this embodiment will be explained below.

The state management unit 15 functions as a controller of the uplink parser unit 11, timer unit 12, frame generation unit 13, and downlink parser unit 14, manages a state machine for each ID for identifying a child station, and controls these hardware processing units.

The state management unit 15 notifies these hardware processing units, by an event frame, of the contents of an event indicating the state change of the link, an event pertaining to a terminating process for a control frame other than link control, or an event pertaining to maintenance operation management such as OAM (Operation Administration and Maintenance).

The event frame contains an ID for identifying a child station, the state number of a state machine to be processed, an event number indicating an event type, type information indicating the type of frame, and data (event data) indicating the contents of the event. An example of the event data is information contained for each ID. The event contents are described in the internal program of the state management unit 15, and a flexible state machine is implemented by rewriting the event contents later.

The uplink parser unit 11 determines the type of the received frame, and performs the process of terminating a control frame. The timer unit 12 operates the timer in accordance with a timer start/stop instruction from the state management unit 15. The frame generation unit 13 generates a control frame corresponding to an instruction from the state management unit 15.

The downlink parser unit 14 receives a downlink data frame from the data processing circuit, and determines whether the downlink data frame contains frame information to be processed as a control frame. If the control frame is contained, the downlink parser unit 14 performs the process of terminating the control frame. If not, the downlink parser unit 14 outputs the data frame to the multiplexer 16.

The criteria and processing contents of frame type determination are described in the internal programs of the uplink parser unit 11 and downlink parser unit 14, and various kinds of frame determination and processing can be performed by changing the internal programs later. An initial value corresponding to the type of timer and a timeout time are described in the internal program of the timer unit 12, and various kinds of timers can be implemented by changing the internal program later.

Next, the operation on the control frame receiving side according to the first embodiment will be explained with reference to FIG. 2 by taking a case in which a register ACK frame is received as an example.

Figure 2:
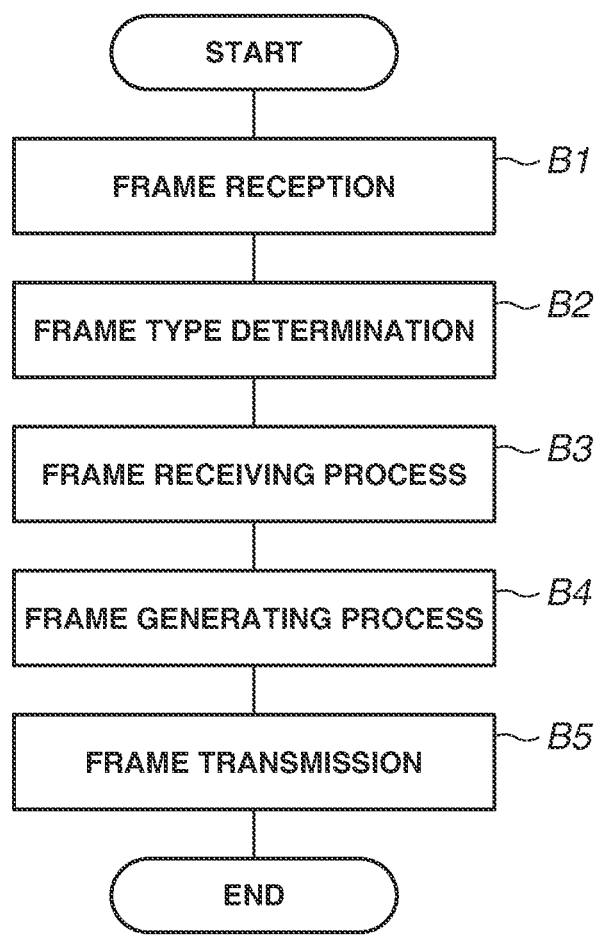
FIG. 2 is a flowchart showing frame processing according to the first embodiment.

As shown in FIG. 2, when the register ACK frame is input to the uplink parser unit 11 (step B1), the uplink parser unit 11 extracts information in a type field and opcode field, and determines the type based on the information (step B2).

If it is determined that the input frame is the register ACK frame, the uplink parser unit 11 performs normal reception/abnormal reception determination. More specifically, as DA discarding determination, the uplink parser unit 11 compares correct DA information stored in the internal register with the input DA information. Also, as drift check determination, the uplink parser unit 11 extracts a time stamp field, calculates an RTT, and compares the RTT with a drift determination reference value stored in the register (step B3). The processing up to this point is equivalent to a frame receiving process shown in FIG. 10.

The operation of the state management unit 15 will now be explained. After these determination processes are complete, the uplink parser unit 11 generates an event frame to the state management unit 15. As event information, the uplink parser unit 11 inserts, into the event frame, an ID, the state number of a state machine which manages an MPCP link, an event number indicating register ACK reception, and "Echoed Assigned Port, Echoed Sync Time" in the register ACK frame, and outputs the event frame to the state management unit 15.

The state management unit 15 having received the event frame output from the uplink parser unit 11 first specifies a state machine which causes a state change based on the ID and state number. In addition, the state management unit 15 compares the value of the received "Echoed Assigned Port, Echoed Sync Time" with the value of "Assigned Port, Sync Time" for report transmission stored in the internal register of the state management unit 15. If the two values match, the state management unit 15 determines that the reception is normal reception.

If it is determined that the reception is normal reception, this means that the link between the ONU and OLT is established, so the state management unit 15 changes the state of the state machine which manages the MPCP link to a linkup state. Subsequently, the state management unit 15 generates two types of event frames to be transmitted to the timer unit 12. One is a stopping process event for a timer which measures a maximum reception interval of the register ACK. The other one is a timer start event for performing alive management of the ONU. The ID, timer type, and measurement time are inserted into information of the event frame.

The cooperation of the uplink parser unit 11, state management unit 15, and timer unit 12 when receiving the register ACK has been explained above. Next, the cooperation of the uplink parser unit 11, state management unit 15, and frame generation unit 13 on the control frame transmitting side will be explained by taking gate frame transmission as an example in correspondence with the continuation of FIG. 2.

After receiving a report frame (step B3), the link control circuit 10 calculates a bandwidth allocation amount to each ONU by using an ONU transmission frame notification amount in the report frame and the DBA algorithm, and notifies the transmission start time by using a gate frame. In this embodiment, the uplink parser unit 11 performs the bandwidth calculation using the DBA algorithm, and transmits the transmission start time to be inserted into the gate frame to the state management unit 15 by using the event frame.

The state management unit 15 having received the transmission start time by using the link control circuit 11 generates a gate frame generation instruction event, and outputs the generated event to the frame generation unit 13. The calculated transmission start time is inserted into the event data of the gate frame generation instruction event. The internal register of the frame generation unit 13 stores the template of a gate frame which does not change from one ID to another. The frame generation unit 13 generates a gate frame by using this template and the transmission start time contained in the event (step B4), and outputs the gate frame outside (step B5).

Effects of First Embodiment

In this embodiment as described above, the link control circuit 10 includes a plurality of hardware processing units configured to operate as the uplink parser unit 11 which outputs, as an event, the contents of link control notified from a child station by an uplink control frame, the timer unit 12 which starts/stops the timer and outputs an event pertaining to the link in accordance with the expiration of the timer, the frame generation unit 13 which generates a downlink control frame containing the contents of link control to be notified to a child station, and the state management unit 15 which manages the link state in accordance with the events from the uplink parser unit 11 and timer unit 12, and instructs the timer unit 12 to start/stop the timer and the frame generation unit 13 to generate a downlink control frame in accordance with the link state, thereby controlling connection establishment, maintenance, and disconnection of the link.

In addition, each of these hardware processing units includes a memory for storing the externally changeable internal program describing the corresponding processing operation, and a processor for executing the processing operation in accordance with the internal program.

More specifically, each hardware processing unit executes the processing operation in accordance with the internal program and the externally changeable parameter stored in the internal register of the hardware processing unit.

Consequently, the host CPU can implement various criteria and processing contents of frame type determination and various kinds of timers by rewriting the internal programs and the parameters in the internal registers of these hardware processing units.

Accordingly, the link control circuit 10 can be configured by the programmable hardware processing units specialized to the link control process. This makes it possible to eliminate an increase in circuit scale and a decrease in processing speed caused by an increase in number of IDs, while maintaining the future extensibility.

Also, in this embodiment, when each hardware processing unit outputs an event frame, an ID for identifying a child station as an object of the processing operation can be added to the event frame to be output. Furthermore, type information for identifying the frame type of an uplink control frame or downlink control frame as an object of the processing operation can be added to the event frame to be output.

Consequently, information to be held for each ID can be held in number equal to the number of IDs, and information to be held for each frame type can be held in common to all IDs. Since this obviates the need for frame accumulation, frame transfer, and frame type determination necessary in the conventional processing flow, the circuit scale can be reduced.

Also, all processes are not executed by processing units different in processing speed difference, but are dispersedly executed by hardware processing units having the same processing speed. Even when the number of IDs increases, therefore, there is no processability difference between the hardware processing units, so the processes can be executed at high speed.

In addition, this embodiment can further include, as a hardware processing unit, the downlink parser unit 14 which selects a downlink data frame to be transmitted to a child station from input downlink frames, and outputs the downlink data frame to a multiplexer which multiplexes the downlink data frame and the downlink control frame output from the frame generation unit 13.

Accordingly, for not only frame determination of the control frame contained in the uplink frame but also frame determination of the control frame contained in the downlink data frame, it is possible to eliminate an increase in circuit scale and a decrease in processing speed caused by an increase in number of IDs by using the hardware processing units, while maintaining the future extensibility.

Second Embodiment

Figure 3:
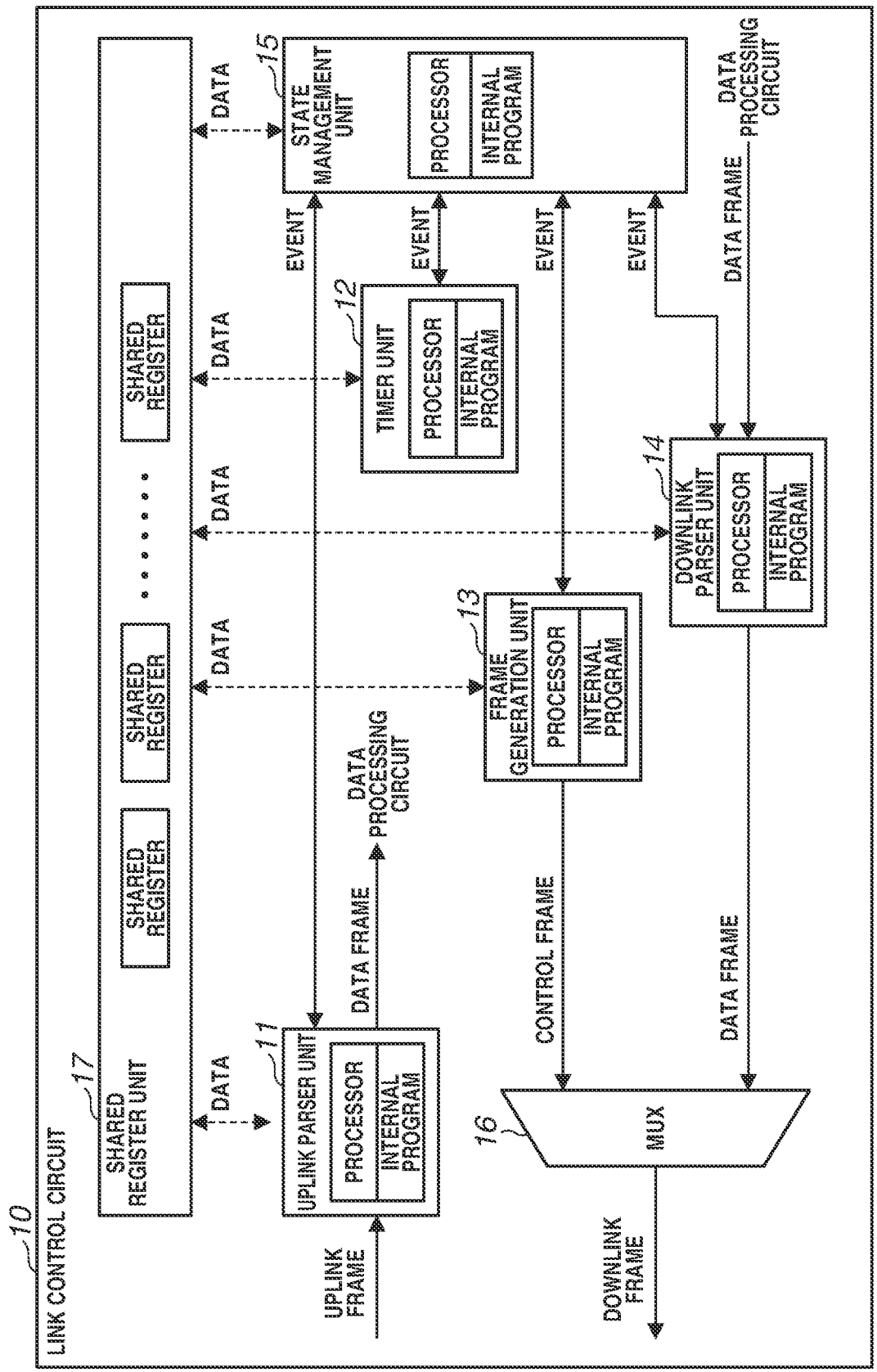
FIG. 3 is a block diagram showing the configuration of a link control circuit according to the second embodiment.

A link control circuit 10 according to the second embodiment of the present invention will be explained below with reference to FIG. 3.

The first embodiment has been explained by taking a case in which each hardware processing unit has an internal register as an example. In this embodiment, as shown in FIG. 3, a case in which shared registers accessible from all hardware processing units are used instead of the internal registers will be explained.

In this embodiment, a shared register unit 17 includes a plurality of shared registers which are shared by all hardware processing units, and each hardware processing unit executes its processing operation in accordance with an internal program and an externally changeable parameter stored in a corresponding shared register in the shared register unit 17.

In this case, information which changes from one ID to another is stored in the shared register unit 17, and each hardware processing unit reads/writes data of the shared register by using the ID as an address.

Effects of Second Embodiment

In this embodiment as described above, the link control circuit 10 further includes the shared register unit 17 including the plurality of shared registers shared by the hardware processing units, and each hardware processing unit executes its processing operation in accordance with its own internal program and the externally changeable parameter stored in the corresponding shared register in the shared register unit 17.

Consequently, information which changes from one ID to another can be accessed from any processing unit, so the processing unit except a state management unit 15 can increase the number of variations of processing using the information. Since, therefore, simpler events can be exchanged between the state management unit 15 and each processing unit, the load on the state management unit 15 can be dispersed.

Third Embodiment

Figure 4:
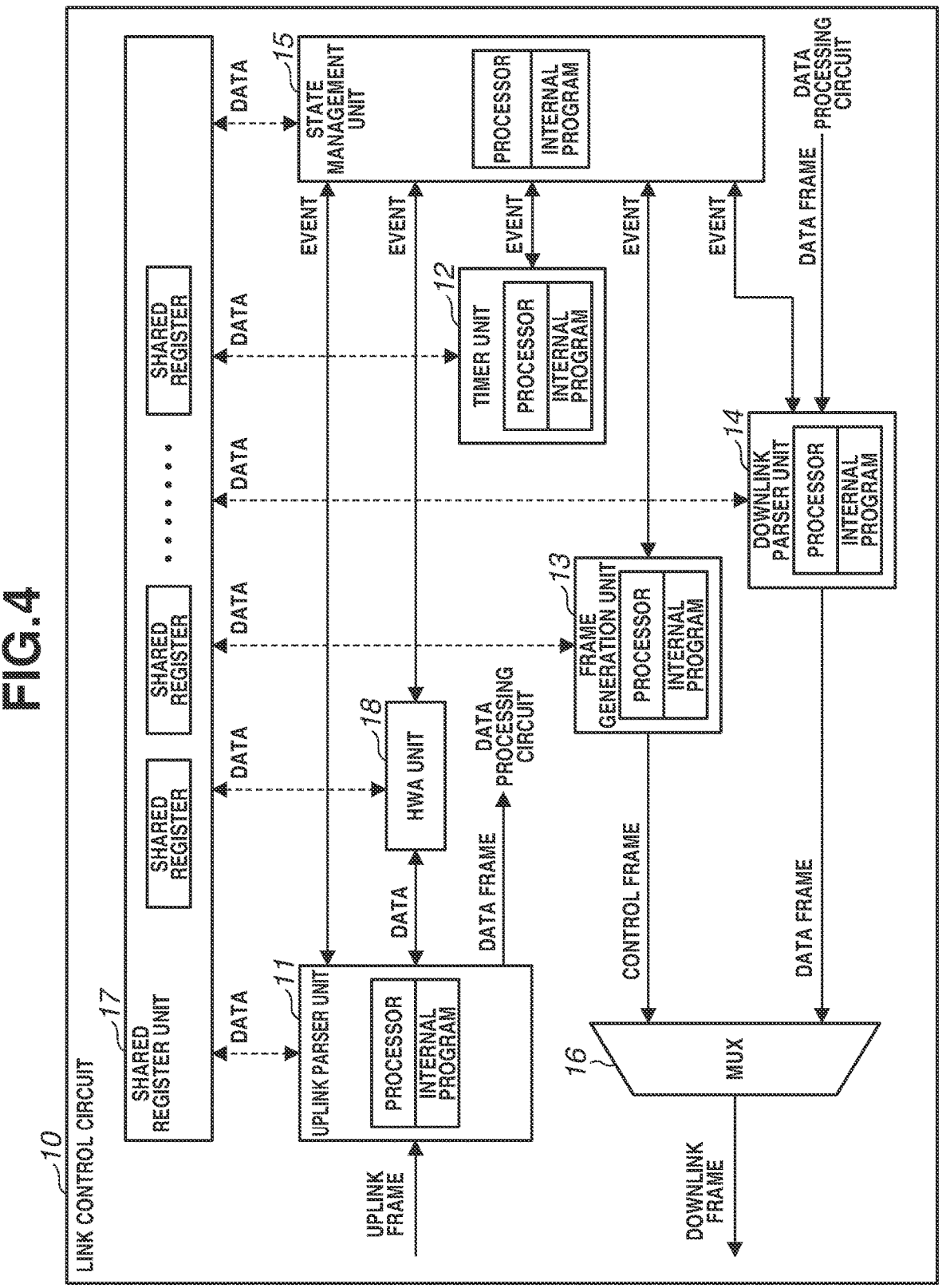
FIG. 4 is a block diagram showing the configuration of a link control circuit according to the third embodiment.
Figure 5:
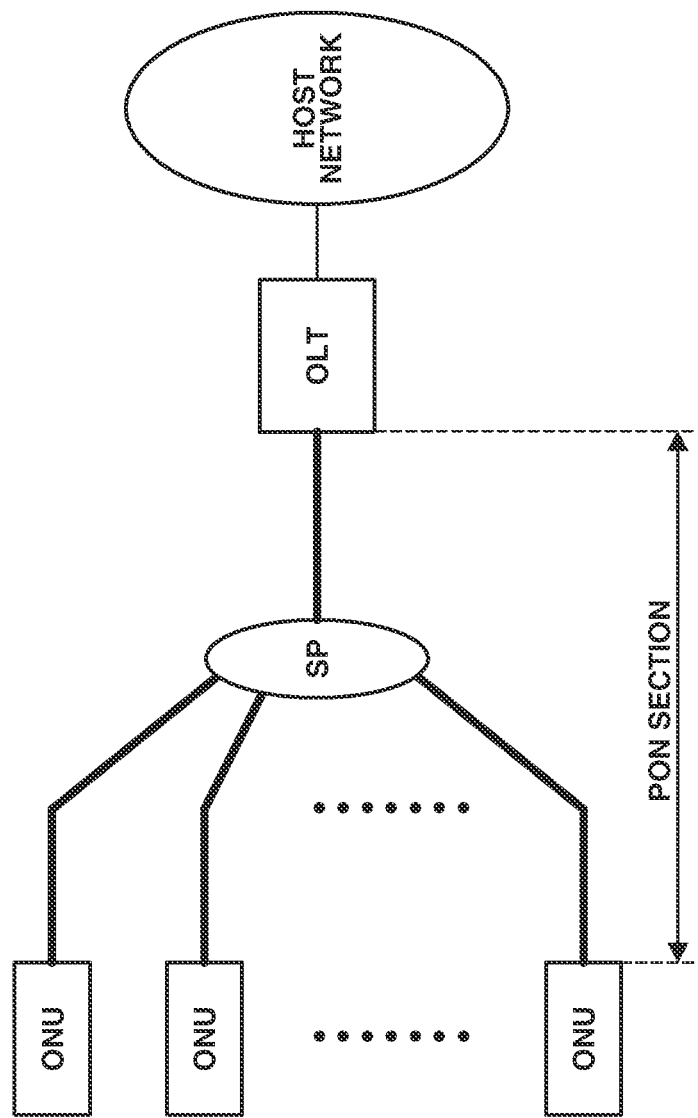
FIG. 5 shows a configuration example of a PON system.
Figure 6:
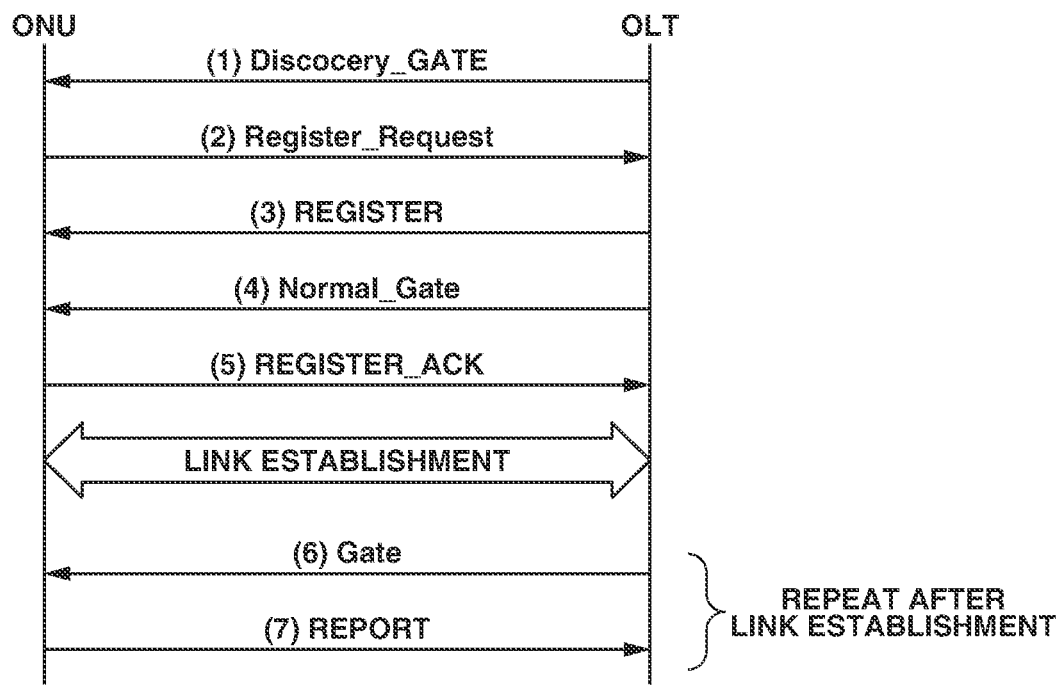
FIG. 6 is a sequence diagram showing a discovery process.

A link control circuit 10 according to the third embodiment of the present invention will be explained below with reference to FIG. 4.

In the first and second embodiments, the uplink parser unit 11 performs the bandwidth calculation. However, the present invention is not limited to this. As shown in FIG. 4, the third embodiment includes a dedicated hardware accelerator (HWA) unit 18. The hardware accelerator unit 18 is notified, by using an event frame, of a data portion to be used in the bandwidth calculation of the report frame, and executes the bandwidth calculation using the DBA algorithm.

Effects of Third Embodiment

As described above, this embodiment further includes the hardware accelerator unit 18 which rapidly executes the frame processing for the uplink control frame in an uplink parser unit 11, as the hardware processing unit of the link control circuit 10. This can reduce the processing load on the uplink parser unit 11, which is apt to be higher than those of other hardware processing units. Accordingly, it is possible to reduce the processing load differences from the other hardware processing units, and increase the operation speed of the whole link control circuit 10.

Note that the hardware accelerator unit 18 may also be used in another application instead of the bandwidth allocation calculation as described above. For example, the hardware accelerator unit 18 may also be used as hardware for finding whether the SA when the register request is received is already registered. It is also possible to use the hardware accelerator unit 18 not in one application but in a plurality of applications.

Note that it is also possible to cause the uplink parser unit 11 to notify, by using an event frame, a state management unit 15 of a data portion to be used in the bandwidth calculation of the report frame, and cause the state management unit 15 to execute the bandwidth calculation using the DBA algorithm.

Extension of Embodiments

The present invention has been explained above by referring to the embodiments, but the present invention is not limited to the above embodiments. Various changes understandable by those skilled in the art can be made on the arrangements and details of the present invention within the scope of the invention. It is also possible to perform the embodiments by freely combining them to the extent that they do not contradict each other.

EXPLANATION OF THE REFERENCE NUMERALS AND SIGNS

10 . . . link control circuit, 11 . . . uplink parser unit, 12 . . . timer unit, 13 . . . frame generation unit, 14 . . . downlink parser unit, 15 . . . state management unit, 16 . . . multiplexer, 17 . . . shared register unit, 18 . . . hardware accelerator unit

The invention claimed is:

1. A link control circuit which is used in a parent station for performing data communication with a plurality of child stations, and controls a link to be used in data communication with the child stations, characterized by comprising a plurality of hardware circuits; including:
  a hardware circuit configured to operate as an uplink parser configured to notify, by an event frame, a content of control of the link notified by an uplink control frame received from the child stations;
  a hardware circuit configured to operate as a timer controller configured to start/stop a timer for managing a state of the link, and notify expiration of the timer by an event frame;
  a hardware circuit configured to operate as a frame generator configured to generate a downlink control frame containing the content of control of the link to be notified to the child stations; and
  a hardware circuit configured to operate as a state manager configured to manage the state of the link in accordance with the event frames from the uplink parser and the timer controller, and, in accordance with the state of the link, instruct the timer controller to start/stop the timer by an event frame, and instruct the frame generator to generate the downlink control frame by an event frame, thereby controlling connection establishment, maintenance, and disconnection of the link,
  wherein each of the plurality of hardware circuits includes a memory configured to store an externally changeable internal program describing a corresponding processing operation and being changeable by a host CPU externally connected to the link control circuit, and a processor configured to execute the corresponding processing operation in accordance with the internal program.

2. The link control circuit according to claim 1, characterized in that the hardware circuit outputs an ID for identifying a child station as an object of the processing operation by adding the ID to the event frame.

3. The link control circuit according to claim 1, characterized in that the hardware circuits output type information for identifying a frame type of the uplink control frame or downlink control frame as an object of the processing operation by adding the type information to the event frame.

4. The link control circuit according to claim 1, characterized in that each of the hardware circuits executes the corresponding processing operation in accordance with the internal program, and an externally changeable parameter stored in an internal register of each of the hardware circuits.

5. The link control circuit according to claim 1, characterized by further comprising a shared register array including a plurality of shared registers to be shared by the hardware circuits,
wherein each of the hardware circuits executes the corresponding processing operation in accordance with the internal program, and an externally changeable parameter stored in the corresponding shared register of the shared register array.

6. The link control circuit according to claim 1, characterized by further comprising, as a hardware circuit, a downlink parser configured to select a downlink data frame to be transmitted to the child station from input downlink frames, and output the downlink data frame to a multiplexer which multiplexes the downlink data frame and the downlink control frame output from the frame generator.

7. The link control circuit according to claim 1, characterized by further comprising, as a hardware circuit, a hardware accelerator unit configured to rapidly execute frame processing on the uplink control frame in the uplink parser.

8. The link control circuit according to claim 2, characterized in that the hardware circuits output type information for identifying a frame type of the uplink control frame or downlink control frame as an object of the processing operation by adding the type information to the event frame.

9. The link control circuit according to claim 2, characterized in that each of the hardware circuits executes the corresponding processing operation in accordance with the internal program, and an externally changeable parameter stored in an internal register of each of the hardware circuits.

10. The link control circuit according to claim 2, characterized by further comprising a shared register array including a plurality of shared registers to be shared by the hardware circuits,
wherein each of the hardware circuits executes the corresponding processing operation in accordance with the internal program, and an externally changeable parameter stored in the corresponding shared register of the shared register array.

11. The link control circuit according to claim 2, characterized by further comprising, as a hardware circuit, a downlink parser configured to select a downlink data frame to be transmitted to the child station from input downlink frames, and output the downlink data frame to a multiplexer which multiplexes the downlink data frame and the downlink control frame output from the frame generator.

12. The link control circuit according to claim 2, characterized by further comprising, as a hardware circuit, a hardware accelerator unit configured to rapidly execute frame processing on the uplink control frame in the uplink parser.

13. The link control circuit according to claim 3, characterized in that each of the hardware circuits executes the corresponding processing operation in accordance with the internal program, and an externally changeable parameter stored in an internal register of each of the hardware circuits.

14. The link control circuit according to claim 3, characterized by further comprising a shared register array including a plurality of shared registers to be shared by the hardware circuits,
wherein each of the hardware circuits executes the corresponding processing operation in accordance with the internal program, and an externally changeable parameter stored in the corresponding shared register of the shared register array.

15. The link control circuit according to claim 3, characterized by further comprising, as a hardware circuit, a downlink parser configured to select a downlink data frame to be transmitted to the child station from input downlink frames, and output the downlink data frame to a multiplexer which multiplexes the downlink data frame and the downlink control frame output from the frame generator.

16. The link control circuit according to claim 3, characterized by further comprising, as a hardware circuit, a hardware accelerator unit configured to rapidly execute frame processing on the uplink control frame in the uplink parser.

17. The link control circuit according to claim 4, characterized by further comprising, as a hardware circuit, a downlink parser configured to select a downlink data frame to be transmitted to the child station from input downlink frames, and output the downlink data frame to a multiplexer which multiplexes the downlink data frame and the downlink control frame output from the frame generator.

18. The link control circuit according to claim 4, characterized by further comprising, as a hardware circuit, a hardware accelerator unit configured to rapidly execute frame processing on the uplink control frame in the uplink parser.

19. The link control circuit according to claim 5, characterized by further comprising, as a hardware circuit, a downlink parser configured to select a downlink data frame to be transmitted to the child station from input downlink frames, and output the downlink data frame to a multiplexer which multiplexes the downlink data frame and the downlink control frame output from the frame generator.

20. The link control circuit according to claim 5, characterized by further comprising, as a hardware circuit, a hardware accelerator unit configured to rapidly execute frame processing on the uplink control frame in the uplink parser.

* * * * *